May 3, 1932.   E. O. LOEBER   1,856,877
RECEPTACLE
Filed Sept. 25, 1931   2 Sheets-Sheet 1
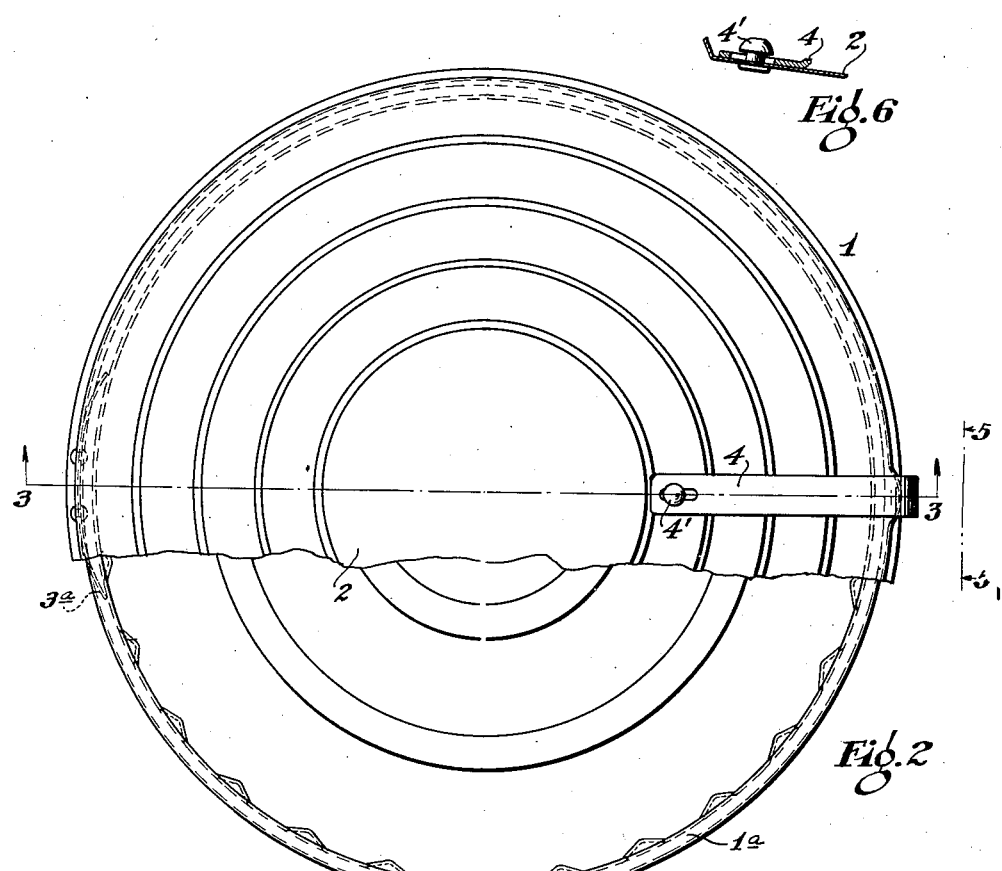
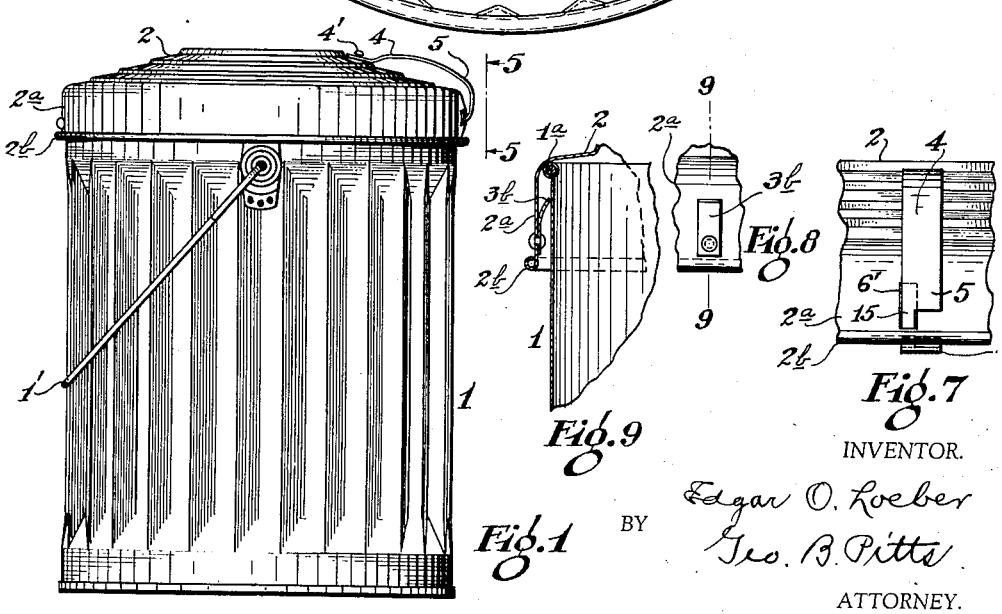
INVENTOR.
Edgar O. Loeber
BY Geo. B. Pitts
ATTORNEY.

May 3, 1932. E. O. LOEBER 1,856,877
RECEPTACLE
Filed Sept. 25, 1931  2 Sheets-Sheet 2

INVENTOR.
Edgar O. Loeber
BY Geo. B. Pitts
ATTORNEY.

Patented May 3, 1932

1,856,877

UNITED STATES PATENT OFFICE

EDGAR O. LOEBER, OF CLEVELAND, OHIO

RECEPTACLE

Application filed September 25, 1931. Serial No. 565,106.

This invention relates to receptacles having a removable, self locking cover, the present embodiment of the invention being particularly adapted for use in connection with what are commonly known as "garbage cans" where it is desirable to prevent tilting, lifting, or removal of the cover either by the force of the wind or by animals.

One object of the invention is to construct a receptacle and a removable cover or lid therefor provided with inter-engaging elements, one of which constitutes a gravity operated handle adapted to lock the cover in position but arranged, when raised relative thereto, to permit ready removal of the cover.

Another object of the invention is to construct a receptacle and a cover or lid therefor having between them self locking elements of relatively simple construction.

Other objects of the invention will be apparent to those skilled in the art to which my invention relates from the following description taken in connection with the accompanying drawings, wherein Fig. 1 is a side elevation of a receptacle embodying my invention.

Fig. 2 is a plan view, with parts broken away.

Fig. 6 is a fragmentary section (enlarged) on the line 3—3 of Fig. 2.

Fig. 7 is a view similar to Fig. 5, but showing a handle having a slightly different form of construction.

Fig. 8 is a fragmentary view showing a different form of inter-engaging device.

Fig. 9 is a section on the line 9—9 of Fig. 8.

Figure 3:
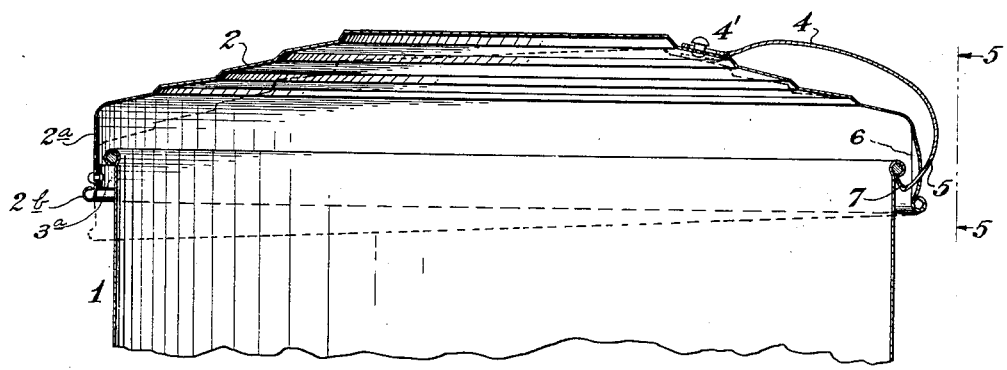
Fig. 3 is a fragmentary section on the line 3—3 of Fig. 2, showing the position of the cover when attempt is made to elevate it.

The receptacle 1, may be of any suitable and convenient form, said receptacle, in the present instance, comprising the usual cylindrical receptacle or container body and provided around its upper marginal edges with an outwardly extending projection 1a, said projection, in the present instance, comprising the usual outwardly extending beaded rim. 1' indicates a bail or handle.

The lid or cover 2 may likewise be of any suitable and convenient form, being provided with a depending rim 2a, adapted to fit over the top of the receptacle or container and preferably provided around its lower or terminating edge with a beaded portion 2b.

As a means of initially mounting and securing one side of the cover 2, to the upper marginal edges of the receptacle 1, one side of the rim 2a, is provided internally with a device 3 disposed in opposed relation to the side wall or body of the receptacle 1 and arranged to engage the bead 1a when attempt is made to raise the cover 2 (see Fig. 3), except when a handle 4, to be later referred to, is first raised, as shown in Fig. 3. The device 3 preferably comprises a resilient, flat metal strip, the free end portion of which normally flexes inwardly, so that when the cover 2 is positioned it tends to move or slide the cover laterally on the bead 1a to more effectively insure engagement of the handle with the bead 1a, as later set forth. In the form of construction shown in Figs. 1, 2 and 3, the device 3 comprises a horizontally disposed resilient metal strip 3a having its intermediate portion suitably riveted to the inner wall of the rim 2a, its end portions being free and normally engaging the side wall or body of the receptacle 1, when the cover is on the receptacle 1, as most clearly shown in Figs. 1 and 2. In Figs. 8 and 9, the device is shown as comprising a vertically disposed resilient metal strip 3b, riveted at its lower end to the internal wall of the rim 2a and extending upwardly, its upper end being free and normally engaging the side wall of the receptacle 1.

Figure 4:
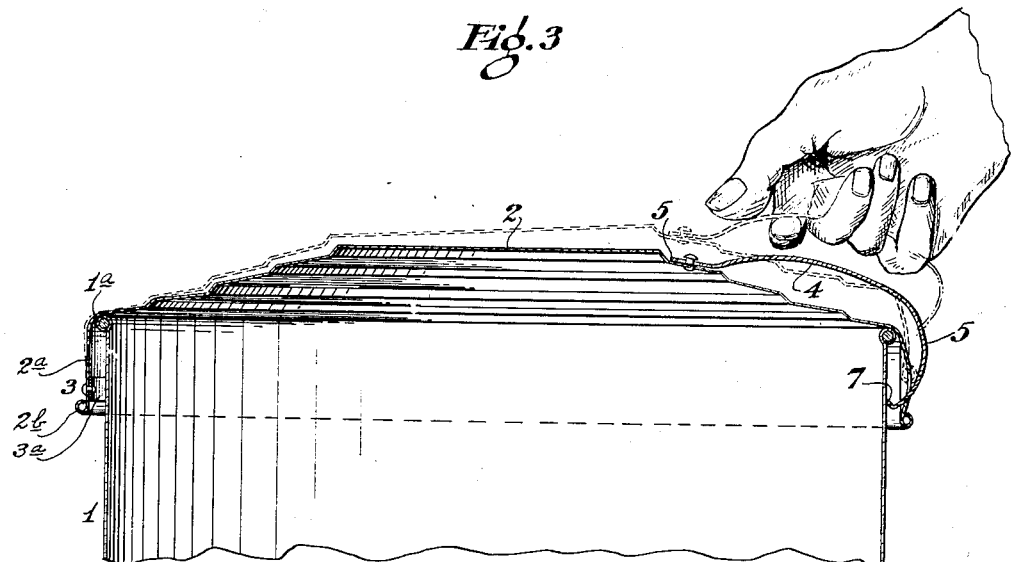
Fig. 4 is a view similar to Fig. 3 showing the position of the handle when raised preparatory to removing the cover in the usual manner.
Figure 5:
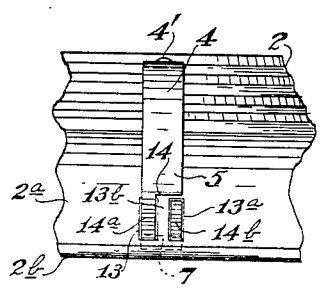
Fig. 5 is a fragmentary section on the line 5—5 of Fig. 2, enlarged.

The handle 4 consists of a section of flat strip metal, pivotally and slidably connected at its inner end to the exterior surface of the cover 2, as shown at 4', its outer portion being turned downwardly and inwardly, as shown at 5. The inwardly extending portion 5 of the handle 4 extends through an elongated vertical slot 6 formed in the adjacent portion of the rim 2a and its free end terminates in an up-turned lip or latch 7. When the handle 4 is in its normal or gravitated position, as shown in Figs. 1, 2 and 4, the lip or latch 7 is operatively related to the bead 1a, being below and within its periphery, so as to inter-engage therewith when attempt is made to tilt, elevate or raise the cover 2, as shown in dotted and full lines in Fig. 3. However, when the handle is grasped, in the operation of removing the cover, it is first raised and slightly slid outwardly relative to the cover, the effect of which is to swing it outwardly and upwardly as shown in dotted lines in Fig. 4, such movement being permitted by the pivotal, slidable connection 4' between the handle and cover. In such operation, the end portion 5 moves through the slot 6 in an upward, outward direction until the lip 7 engages the upper end wall of the slot 6, such direction of movement serving to so position the latch 7 that in the continued raising movement the lip 7 clears the bead 1a and through its engagement with the slot end wall the cover is carried upwardly with the handle. After the latch 7 passes the bead 1a, the cover may be further raised bodily and removed without interference or engagement of the device 3 at the opposite side of the cover with the adjacent portion of the rim 1a. To insure clearance of the latch 7 before it engages the upper end wall of the slot 6, after the handle 4 is raised relative to the cover, that portion of the rim 2a, in which the slot 6 is formed, is provided with an outwardly extending bulge 8, and the upper end of the slot 6 terminates approximately centrally of the bulge 8, so that when the latch 7 is stopped by the upper end wall of the slot the latch is disposed at the outermost position provided by the bulge.

The outer portion of the handle 4 is preferably inclined or curved downwardly and inwardly, so that when upward pressure is applied to the cover or rim 2a, the bottom wall of the slot 6 will engage such portion and through it maintain the latch 7 in operative relation to the bead 1a while swinging the handle 4 upwardly.

The connection 4' preferably comprises a stepped stud or rivet 9 having its inner end fixedly mounted in the cover 2 and an elongated slot 10 formed in the inner end portion of the handle. The body of the rivet 9 extends loosely through the slot 10 and is provided with a head 11 spaced from the top surface of the cover 2 so that the handle is free to slide endwise and also pivot or swing on the body of the rivet, the head 11 serving to maintain the handle in connected relation to the body of the rivet.

I preferably provide interlocking means between the end portion 5 of the handle 4 and the rim 2a so that the latch 7 cannot be withdrawn through the slot 6 and thus render the handle inoperative to engage the bead 1a and non-cooperative with the device 3. In the form of construction shown in Figs. 1 to 5, the interlocking means comprise the following: 13, 13a, indicate two vertical slots formed in the rim 2a, spaced by the wall 13b. 14 indicates an elongated recess or opening formed centrally in the end portion 5 and extending from the latch 7 upwardly, thereby providing two spaced bars 14a, 14b, which extend through and are slidable in the slots 13, 13a, respectively, one bar (for example, the bar 14b) being slitted transversely to permit of assembly. As the latch 7 extends across the wall 13b and is connected to the bars 14a, 14b, it will be seen that the end portion 5 and latch 7 is operatively connected to the rim 2a and cannot be distorted and bent into an inoperative or ineffective position except by the use of undue force.

In the form of interlocking means shown in Fig. 7, the slot 6' formed in the rim 2a is relatively narrow and the handle portion 5 is cut away on one edge to form a bar 15 which projects through and slides in the slot 6'. As the latch 7' extends laterally relative to the bar 15, it lies behind the adjacent portion of the rim 2a and thus prevents the end portion 5 from being withdrawn or the latch 7 moved to an inoperative position.

From the foregoing description it will be noted that I provide a freely movably handle which is operated upwardly and outwardly to release the cover and when released it gravitates into operative relation to the adjacent portion of the bead 1a so that the cover becomes automatically locked to the receptacle; also, that I provide pivotal and slidable connections between the opposite ends of the handle 4 and cover, whereby the handle 4 is guided in its movement in either direction. It will also be noted that my construction is relatively simple in that it comprises few parts, is easily made and is readily operated; also that the parts are connected and related to insure long life and withstand hard use.

By preference, the device 3 and handle 4 are disposed in diametrical relation and are co-operative to lock the cover 2 on the receptacle 1, especially when the cover is moved in a direction substantially axially of the receptacle or when the upward pressure on the cover is applied at one edge thereof intermediate the device 3 and handle 4.

By making the device 3 of resilient metal, it tends to maintain that side of the rim 2a carrying the handle 4 in close engagement with the bead 1a. This permits the cover 2 to be made large enough to readily fit the rim 1a so that it may be easily removed and replaced.

It will be noted that after the handle 4 is initially raised to release the latch 7 from the bead 1a, the cover 2 may be swung about an axis disposed adjacent the diametrical opposite portion of the receptacle 1. From this it will be apparent that the connection for the cover at that side thereof opposite the handle 4 may be in the form of a typical hinge instead of a detachable connection or one that is effected by engagement or disengagement such as herein shown.

To those skilled in the art to which my invention relates, many changes in construction and widely differing embodiments and applications of the invention will suggest themselves without departing from the spirit and scope of the invention. My disclosures and the description herein are purely illustrative and are not intended to be in any sense limiting.

What I claim is:

1. A container construction comprising a receptacle having a projection, a cover having a depending rim formed with an opening, a handle having its inner end portion pivotally and slidably connected to said cover to move relative thereto outwardly substantially in the plane of such portion, the outer end portion of said handle being bent downwardly and inwardly and movably extending through said opening, a latch on the outer end of said handle disposed below and within said projection when the handle is in its lower position and arranged to clear said projection when the handle is initially operated to elevate said cover, said handle and rim being provided with interlocking portions arranged to engage each other when the handle is raised to connect said handle to the rim for bodily raising the latter, and devices between another portion of the cover and said receptacle providing an operative connection of the cover therewith.

2. A container construction comprising a receptacle having a marginal projection, a cover for said receptacle having a depending rim, said rim being formed with a slot, a handle having its inner end portion pivotally and slidably connected to said cover to move relative thereto outwardly substantially in the plane of such portion, the outer end portion of said handle extending through and movable in said slot to permit movement of the handle toward and from said cover, and a latch on the outer end of said handle disposed below and within said projection when the handle is in its lower position and arranged to clear said projection when the handle is raised relative to said cover said latch extending laterally of said slot and arranged to engage the rim when the handle is raised to connect the outer end of the handle thereto.

3. A container construction comprising a receptacle having a marginal projection, a cover for said receptacle having a depending rim, said rim being formed with a slot disposed below said projection when said cover is in position, a handle having its inner end portion pivotally and slidably connected to said cover to move relative thereto outwardly substantially in the plane of such portion, the outer end portion of said handle extending through and movable in said slot, to permit movement of the handle toward and from said cover, a latch on the outer end of said handle disposed below and within said projection when the handle is in its lower position and arranged to clear said projection when the handle is raised relative to said cover, and means between the outer end portion of said handle and said rim for preventing withdrawal of said end portion through said slot.

4. A container construction comprising a receptacle having a marginal projection, a cover for said receptacle having a depending rim, said rim being formed with a slot, a handle having its inner end portion pivotally and slidably connected to said cover to move relative thereto outwardly substantially in the plane of such portion, the outer end portion of said handle extending through and movable in said slot to permit movement of the handle toward and from said cover, a latch on the outer end of said handle disposed below and within said projection when the handle is in its lower position and arranged to clear said projection when the handle is raised relative to said cover, and means between the outer end portion of said handle and said rim for preventing withdrawal of said end portion through said slot, the outer end portion of the handle extending inwardly and downwardly and arranged to be engaged by the lower end wall of said slot to maintain said latch in operative position when force is applied to the cover to elevate it.

5. A container comprising a receptacle having a bead around its open end and a cover having a rim fitting over the open end of said receptacle and formed with an opening, a handle having a flat inner end portion formed with a longitudinally extending slot, a headed pin on said cover extending through said slot and arranged to slidably and pivotally connect said handle to said cover, the outer end portion of said handle extending through said opening for movement vertically therein, a latch on the outer free end of said handle arranged to engage said bead when force is applied to the cover to remove it but arranged to free the said bead when the handle is raised relative to said cover, and means between said handle and rim for connecting the handle thereto when the handle is raised relative to the cover, whereby the cover may be removed.

6. A container construction comprising a receptacle having a marginal projection, a removable cover having a depending rim formed with a slot, and devices on said cover adapted to engage said projection and prevent removal of the cover when force is applied thereto to raise it, one device comprising a handle pivotally mounted at its inner end on said cover, its outer end portion extending through said slot for removable engagement with said projection, said handle when raised being arranged to clear said projection, and the other device disposed on the inner side of said rim and consisting of a horizontally disposed flat spring fixed face to face to said rim intermediate its ends and having its opposite ends curved inwardly and normally engaging the receptacle side wall below said projection when the cover is in position.

In testimony whereof, I have hereunto affixed my signature.

EDGAR O. LOEBER.